March 24, 1936.　　W. A. BEAUCHAMP ET AL　　2,035,216
HASP FASTENER DEVICE
Filed Dec. 7, 1932　　2 Sheets-Sheet 1
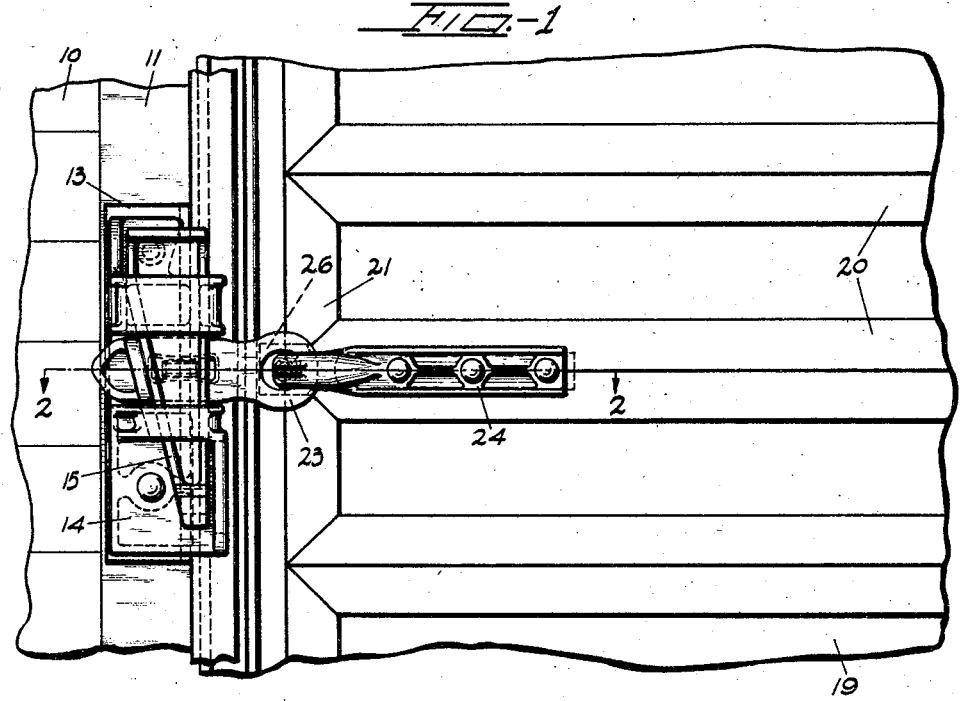
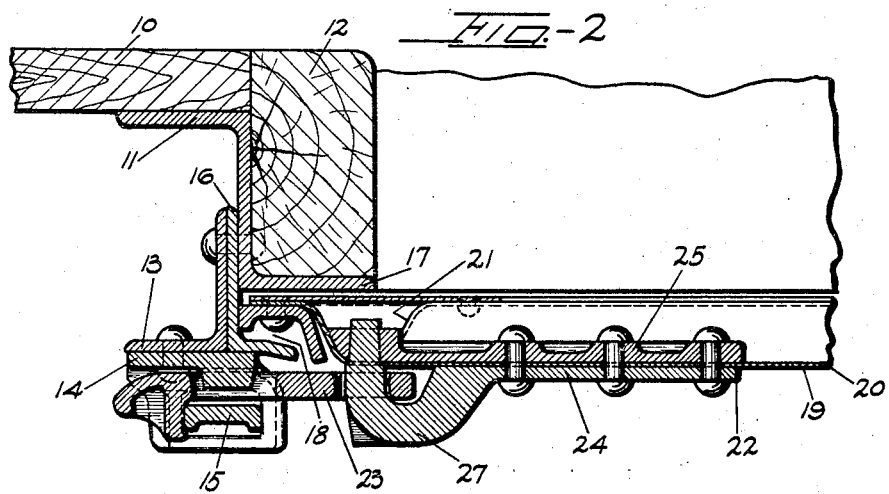
~INVENTORS~
WILFRED A. BEAUCHAMP
GEORGE R. TREPTOW
By~ Samuel Ruu
ATTY.

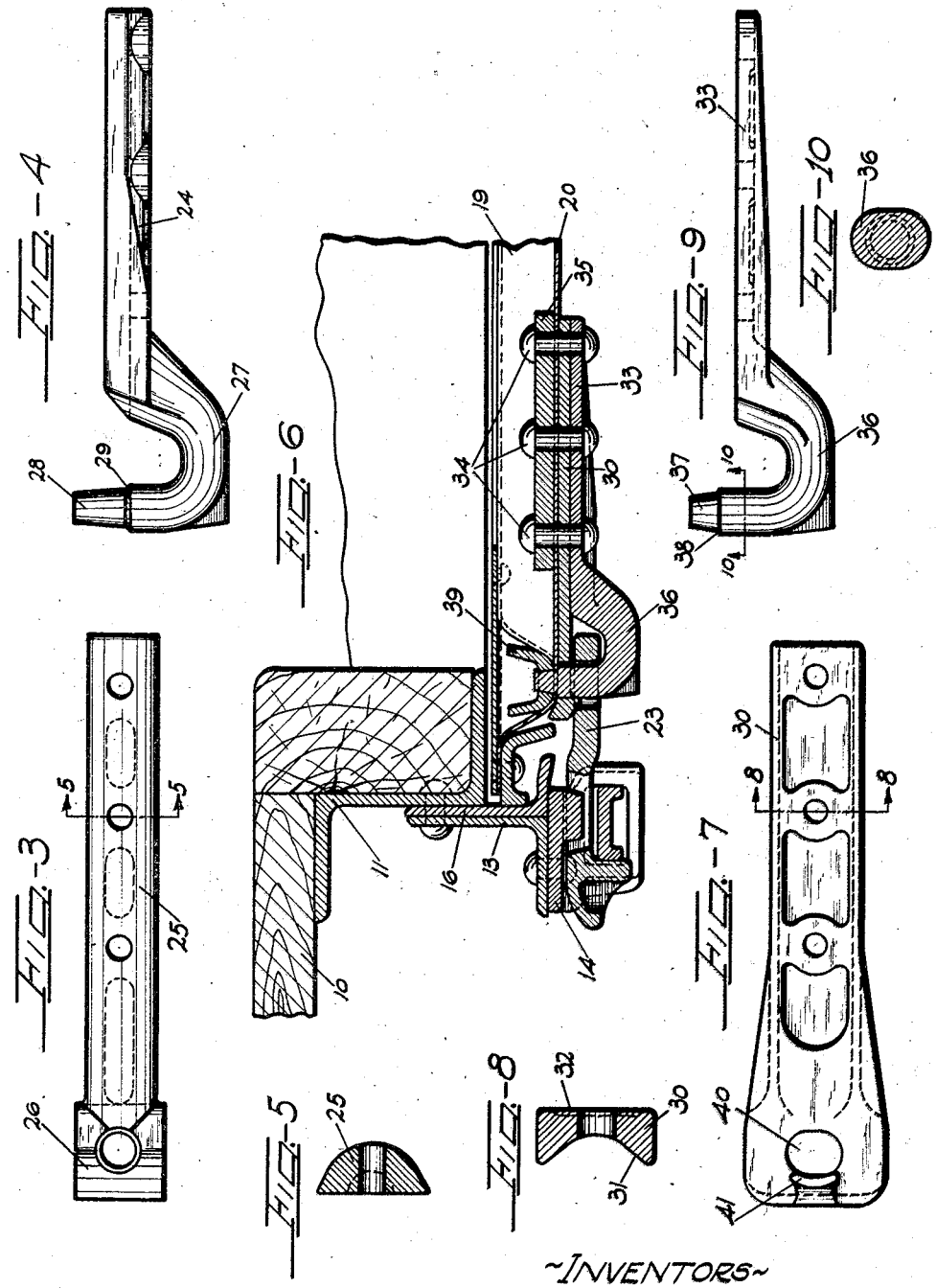

Patented Mar. 24, 1936

2,035,216

UNITED STATES PATENT OFFICE 2,035,216

HASP FASTENER DEVICE

Wilfred A. Beauchamp and George R. Treptow, Chicago, Ill., assignors, by mesne assignments, to The Youngstown Steel Door Company, Cleveland, Ohio, a corporation of Ohio Application December 7, 1932, Serial No. 646,070

2 Claims. (Cl. 292—281)

This invention relates to hasp fastener devices.

It is an object of this invention to provide hasp fastener devices for sliding car doors wherein the stresses incident upon said devices are carried to the rivets securing said devices to said doors.

A further object is to provide hasp fastener devices for car doors comprising a fastener and a reinforcing member having engagement to transmit the stresses incident upon the fastener through the reinforcing member directly to the rivets securing said devices to said doors.

A further object is to provide hasp fastener devices for sliding car doors comprising a fastener and a reinforcing member, the fastener having a neck portion adapted to extend through the door and reinforcing member to relieve the door of stresses transmitted to said neck portion, said stresses being carried by the reinforcement directly to the rivets securing the devices to the doors.

A further object is to provide hasp fastener devices for car doors comprising a fastener and a reinforcing member, the former having a neck portion, the free end of which extends through aligned openings in the door and reinforcing member, engagement being provided between the end of the neck portion and the reinforcing member whereby pulling out of the end and tearing of the door adjacent the opening therein is avoided.

A further object is to provide hasp fastener devices for sliding car doors comprising a fastener and a reinforcing member engaged therewith, the fastener and member affording increased bearing between the parts of the devices.

A further object is to provide hasp fastener devices comprising a fastener and a reinforcing member and to associate said fastener and said member with said door so as to avoid tearing thereof where the fastener passes through the door.

Other objects will become clear as the description of this invention proceeds.

In the drawings forming part of this specification

Figure 1 is a fragmentary elevation of a portion of a railway house car showing the invention applied to a door provided on said car;

Figure 2 is a horizontal section taken on line 2—2 of Figure 1;

Figure 3 is a plan view of the reinforcing member utilized with the embodiment of the invention illustrated in Figure 1 of the drawings;

Figure 4 is a side elevation of the hasp fastener of said embodiment of the invention;

Figure 5 is a sectional view taken on line 5—5 of Figure 3;

Figure 6 is a horizontal section similar to Figure 2, showing a modified form of the invention;

Figure 7 is a plan view of the reinforcing member of the embodiment of the invention shown in Figure 6 of the drawings;

Figure 8 is a section taken on line 8—8 of Figure 7;

Figure 9 is a side elevation of the hasp fastener utilizing the embodiment of the invention shown in Figure 6; and Figure 10 is a sectional view taken on line 10—10 of Figure 9.

Referring to the embodiment of the invention illustrated in Figures 1 to 5, inclusive, the numeral 10 designates the siding of a railway house car to which a metallic post 11, provided with a wood filler 12, is secured. The post 11 carries an angle member 13 which is adapted to retain a lock plate designated in its entirety by the numeral 14 and including in its construction a tapered locking pin 15. The post 11 further has secured thereto a front stop angle member 16 which, together with the horizontally extending flange 17 of the post, provides a recess 18 for the reception of the forward edge of a sliding door 19 provided on the car side.

As illustrated in Figures 1 to 5, inclusive, the door 19 which preferably is provided with a plurality of horizontal corrugations 20 merging at their ends into vertical corrugations 21 (one only of which is illustrated) is provided with a hasp fastener device indicated as a whole by the numeral 22 and carrying a hasp 23 adapted to co-act with the lock plate 14 in order to secure the door in closed position. The hasp fastener device of the instant embodiment of the invention comprises a hasp fastener 24 and a reinforcing member 25. The hasp fastener is secured to the door upon a horizontal corrugation 20 lying upon the outer face of the door, and for this purpose is shaped to conform to the corrugation. The reinforcing member 25 is positioned within said corrugation or upon the inside of the door. Common securing means passing through the hasp fastener, the door and the reinforcing member are utilized to secure these parts together. The reinforcing member 25 is of such extent that it extends into the vertical corrugation 21 and for this purpose the end of the stiffener lying in said vertical corrugation is half round in section so as to conform to the section of said corrugation and serve as reinforcement therefor. It is to be noted that the half round end 26 of the reinforcing member 25 is of greater depth than the remainder of said member for a purpose which will hereinafter appear.

The end of the hasp fastener 24 adjacent the forward edge of the door is provided with a neck or hook portion 27, the end 28 of which is reduced in section and tapered, thereby providing a ledge or shoulder portion 29. The tapered end of the neck or hook portion 27 extends through aligned openings provided in the vertical corrugation 21 and in the end portion 26 of the reinforcing member, these openings being closed by the shoulder portion so as to prevent light and dust from entering the car through said openings. The section of the neck portion of the hasp fastener adjacent the shoulder provided thereon is preferably oblong in section. This oblong section provides, in view of the fact that its major axis extends transversely of the hasp fastener or in other words in substantially right angular relation to the pull exerted thereupon by the hasp 23, a stronger construction for resisting bending of the neck portion under the pull exerted by the hasp.

It becomes apparent from the foregoing construction of the hasp fastener device that by the engagement between the end of the neck portion and the end 26 of the reinforcing member a construction is provided whereby the stresses incident upon the neck of the hasp will be transmitted to the reinforcing member and carried by the reinforcing member directly to the rivets securing said member and said fastener to the door. In view of these facts it is apparent that tearing of the vertical corrugation adjacent the opening therein through which the end of the neck portion extends is obviated. Moreover, in view of the engagement between the ends of the neck portion of the fastener and the reinforcing member the tendency of the end of the neck portion to turn rearwardly or to the right and to pull through the vertical corrugation is counteracted. The increased depth of the end 26 of the reinforcing member provides in this regard an increased bearing between the end of the neck portion and the end 26 of the reinforcing member materially enhancing this counteracting effect.

A modified embodiment of the invention is illustrated in Figures 6 to 10, inclusive, of the drawings. In this embodiment a reinforcing member 30 is utilized and positioned upon a horizontal corrugation 20 of the door. As clearly illustrated in Figure 8 of the drawings the reinforcing member 30 is provided with an arcuate underside 31 conforming to the contour of the corrugation upon which the member is placed and a flat upper portion 32. A hasp fastener 33 is placed upon the reinforcing member 30. The reinforcing member and hasp fastener are secured by means of a plurality of rivets 34 to the door, these rivets passing through a backing plate 35 seated within the horizontal corrugation.

The hasp fastener 33 is provided at one end with a neck or hook portion 36. The end 37 of the hook portion, which is tapered, is reduced in size in order to provide a shoulder 38 adapted to be positioned upon the vertical corrugation of the door and to close the opening therein through which the reduced end 37 extends. This reduced end additionally extends through an opening provided in a reinforcing member 39 positioned within and adapted to reinforce the vertical corrugation.

In order to intimately connect the neck of the hasp fastener with the reinforcing member, said neck is adapted to extend into an opening 40 provided in the reinforcing member 30 adjacent one end thereof. It will be apparent from Figures 7 and 10 of the drawings that the portion of the neck of the hasp fastener and the opening in the reinforcing member within which said portion extends are substantially oblong with the larger axis presented transversely to the direction of pull upon said neck. By this construction increased bearing and strength is afforded. The bearing area is further increased by the projection 41 formed on the reinforcing member adjacent the opening 40 thereof, as clearly shown in Figure 7 of the drawings. It will be apparent from the structure of this embodiment of the invention that the stresses incident upon the neck of the hasp fastener will be transmitted through the reinforcing member directly to the rivets securing these parts to the door. As in the first described embodiment, tearing of the door sheet will be avoided. Moreover, the shoulder 38 provided on the hasp fastener will prevent entrance of light and dust into the interior of the car.

It will be apparent that numerous changes and modifications in the embodiments of the invention disclosed will be manifest to those skilled in the art. It is intended, therefore, that all such changes and modifications be comprehended within this invention, which is to be limited only by the scope of the appended claims.

We claim:

1. In a metallic railway car door, the combination with the merging horizontal and vertical corrugations formed in said door, of a hasp fastener secured upon said horizontal corrugation, said fastener being provided with a neck adapted to support a hasp, the end of said neck extending through the vertical corrugation, a reinforcing member lying within and secured to said horizontal corrugation, said member having a portion of greater depth than the rest of said member extending into and conforming with said vertical corrugation, the end of said neck extending through said portion.

2. In a metallic car door having a single ply metallic panel, a hasp fastener secured upon the outside of said panel, said fastener being provided with a neck adapted to support a hasp, the end of said neck extending through said metallic panel, a reinforcing member for said hasp fastener secured upon the inside of said panel, said member having a portion of greater depth than the rest of said member, the end of said neck extending through said portion for the purpose set forth.

WILFRED A. BEAUCHAMP.
GEORGE R. TREPTOW.